US011999197B2

(12) United States Patent
Watanabe

(10) Patent No.: US 11,999,197 B2
(45) Date of Patent: Jun. 4, 2024

(54) PNEUMATIC TIRE

(71) Applicant: The Yokohama Rubber Co., LTD., Tokyo (JP)

(72) Inventor: Daisuke Watanabe, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 237 days.

(21) Appl. No.: 17/042,045

(22) PCT Filed: Mar. 22, 2019

(86) PCT No.: PCT/JP2019/012134
§ 371 (c)(1),
(2) Date: Sep. 25, 2020

(87) PCT Pub. No.: WO2019/188803
PCT Pub. Date: Oct. 3, 2019

(65) Prior Publication Data
US 2021/0023889 A1    Jan. 28, 2021

(30) Foreign Application Priority Data
Mar. 26, 2018   (JP) .................................. 2018-058349

(51) Int. Cl.
*B60C 11/12*   (2006.01)
*B60C 11/03*   (2006.01)

(52) U.S. Cl.
CPC ...... *B60C 11/1236* (2013.01); *B60C 11/0318* (2013.01); *B60C 11/033* (2013.01); *B60C 2011/1254* (2013.01)

(58) Field of Classification Search
CPC ............. B60C 11/0304; B60C 11/0327; B60C 11/0306; B60C 11/0318; B60C 11/033;
(Continued)

(56) References Cited

U.S. PATENT DOCUMENTS 4,474,223 A * 10/1984 Landers .................. B60C 11/11
                                                    152/209.2
D856,913 S * 8/2019 Furusawa .................... D12/604
(Continued)

FOREIGN PATENT DOCUMENTS

JP    2003159911 A *  6/2003   ......... B60C 11/1218
JP    2009-248961      10/2009
(Continued)

OTHER PUBLICATIONS

International Search Report for International Application No. PCT/JP2019/012134 dated Jun. 18, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

In a pneumatic tire, an intermediate land portion is provided with a plurality of lug grooves having acute bent portions and a plurality of sipes extending in a direction that intersects with the lug grooves. The lug grooves are disposed so as not to overlap one another in the tire circumferential direction, and each have one end that opens to an outer main groove and an other end that terminates in the intermediate land portion. When pitches, which serve as reference positions, are defined based on end points at which the lug grooves open to the outer main groove, the sipes each are disposed to be located inside one of the pitches, and the groove area ratio in the pitches in the intermediate land portion is in the range from 15% to 25%.

7 Claims, 2 Drawing Sheets

(58) Field of Classification Search
CPC ..... B60C 2011/0341; B60C 2011/0358; B60C 2011/0381; B60C 2011/0383; B60C 2011/0386; B60C 2011/1254
See application file for complete search history.

(56) References Cited

U.S. PATENT DOCUMENTS

| | | | | |
|---|---|---|---|---|
| D876,328 S | * | 2/2020 | Furusawa | ............... D12/588 |
| 2002/0153077 A1 | * | 10/2002 | Hanya | ............... B60C 11/13 |
| | | | | 152/209.9 |
| 2007/0051448 A1 | * | 3/2007 | Yumii | ............... B60C 11/0318 |
| | | | | 152/209.18 |
| 2009/0255614 A1 | | 10/2009 | Ebiko | |
| 2010/0186861 A1 | * | 7/2010 | Ishiguro | ............... B60C 11/1369 |
| | | | | 152/209.25 |
| 2010/0224296 A1 | | 9/2010 | Dobashi et al. | |
| 2012/0168050 A1 | | 7/2012 | Terashima | |
| 2016/0207359 A1 | | 7/2016 | Nukushina | |
| 2017/0190222 A1 | | 7/2017 | Suzuki | |
| 2018/0339556 A1 | * | 11/2018 | Mizushima | ............ B60C 11/1236 |

FOREIGN PATENT DOCUMENTS

| | | | | |
|---|---|---|---|---|
| JP | 2010-047134 | | 3/2010 | |
| JP | 2012-140092 | | 7/2012 | |
| JP | 2014-205410 | | 10/2014 | |
| JP | 2014205410 A | * | 10/2014 | ............ B60C 11/04 |
| JP | 2015-048048 | | 3/2015 | |
| JP | 2016-128297 | | 7/2016 | |
| JP | 2017-196978 | | 11/2017 | |
| JP | 2017-222280 | | 12/2017 | |
| WO | WO 2009/047999 | | 4/2009 | |
| WO | WO 2015/033818 | | 3/2015 | |
| WO | WO 2016/024593 | | 2/2016 | |
| WO | WO 2017/187734 | | 11/2017 | |

\* cited by examiner

PNEUMATIC TIRE

TECHNICAL FIELD

The present technology relates to a pneumatic tire suitable as an all-season tire and particularly relates to a pneumatic tire that can improve snow performance while suppressing a decrease in the block rigidity.

BACKGROUND ART

In all-season tires, there is a demand to exhibit excellent snow performance during snowfall. In contrast, in the known all-season tire, by providing a plurality of bent lug grooves in the land portion of the tread portion, the edge components caused by the grooves are caused to act in all directions, and the snow performance is improved by providing a plurality of sipes in the land portion of the tread portion (see, for example, Japan Unexamined Patent Publication No. 2014-205410).

However, when the plurality of bent lug grooves are provided in the tread portion, there is a problem in that block rigidity is reduced. Additionally, depending on the arrangement of the sipes provided in the tread portion, a decrease in block rigidity may be promoted. When block rigidity decreases, wear resistance lowers, and steering stability performance on dry road surfaces also decreases.

SUMMARY

The present technology provides a pneumatic tire that can improve snow performance while suppressing a decrease in block rigidity.

A pneumatic tire according to the present technology includes: an annular tread portion extending in a tire circumferential direction; a pair of sidewall portions disposed on both sides of the tread portion; and a pair of bead portions disposed inward of the sidewall portions in a tire radial direction, the tread portion is provided with four main grooves including a pair of inner main grooves and a pair of outer main grooves, the main grooves extending in the tire circumferential direction, a center land portion, a pair of intermediate land portions located outward of the center land portion, and a pair of shoulder land portions located outward of the intermediate land portions are divided via the main grooves, the intermediate land portion is provided with a plurality of lug grooves each having an acute bent portion, and a plurality of sipes extending in a direction that intersects with the lug grooves, the lug grooves are disposed so as not to overlap one another in the tire circumferential direction, and each have one end that opens to the outer main groove and an other end that terminates in the intermediate land portion, when pitches are defined based on end points, which serve as reference positions, at which the lug grooves open to the outer main groove, the sipes each are disposed to be located inside one of pitches, and a groove area ratio in the pitches in the intermediate land portion is in a range from 15% to 25%.

According to the present technology, the intermediate land portion is provided with the plurality of lug grooves each having the acute bent portion, and the plurality of sipes extending in the direction that intersects with the lug grooves, the lug grooves are disposed so as not to overlap one another in the tire circumferential direction, and each have one end that opens to the outer main groove and the other end that terminates in the intermediate land portion. In this manner, snow performance (in particular, steering stability performance on snow-covered road surfaces) can be improved while suppressing a decrease in block rigidity. Additionally, when pitches are defined based on end points, which serve as reference positions, at which the lug grooves open to the outer main groove, the sipes each are disposed to be located inside one of pitches, and a groove area ratio in the pitches in the intermediate land portion is in a range from 15% to 25%. As a result, a decrease in the pattern rigidity can be suppressed. Furthermore, since the decrease in block rigidity can be suppressed, wear resistance as well as steering stability performance on dry road surfaces can be improved.

According to the present technology, a distance A in the tire circumferential direction from an apex of the bent portion of the lug groove to the pitch adjacent to the pitch where the lug groove is included, and a pitch length P in the tire circumferential direction of the pitch where the lug groove is included preferably satisfy a relationship $0 \leq A \leq P \times 0.05$. This configuration can efficiently improve snow performance.

According to the present technology, a distance in the tire lateral direction from an apex of a bent portion of the lug groove to the inner main groove is preferably in a range from 1/5 to 1/4 of a width of the center land portion. As a result, block rigidity can be made uniform in the center land portion and the intermediate land portions, thereby effectively improving steering stability performance on dry road surfaces.

According to the present technology, a difference between a groove area ratio of the intermediate land portion and a groove area ratio of the shoulder land portion in a ground contact region is preferably 3% or less. This can efficiently improve steering stability performance on snow-covered road surfaces.

According to the present technology, the sipes are grooves having a groove width of 1.5 mm or less. The groove area ratio is the percentage (%) of the total area of the grooves included in a land portion to the total area of the land portion in the ground contact region. Specifically, the groove area ratio of the intermediate land portion is the ratio of the total area of the grooves in the intermediate land portion to the total area of the intermediate land portion included in the ground contact region, and the groove area ratio of the shoulder land portion in the ground contact region is the ratio of the total area of the grooves in the shoulder land portion to the total area of the shoulder land portion included in the ground contact region. The "ground contact region" refers to a region in the tire lateral direction corresponding to the maximum linear distance in the tire lateral direction of a ground contact surface formed on a flat plate when a tire is inflated to an air pressure, which corresponds to the maximum load capacity defined by the standards (JATMA (The Japan Automobile Tyre Manufacturers Association, Inc.), TRA (The Tire and Rim Association, Inc.), ETRTO (The European Tyre and Rim Technical Organisation), and the like), and is placed vertically on the flat plate in a stationary state, and loaded with a load equivalent to 80% of the maximum load capacity. The ground contact end is an outermost position of the ground contact region in the tire lateral direction.

DETAILED DESCRIPTION

Figure 1:
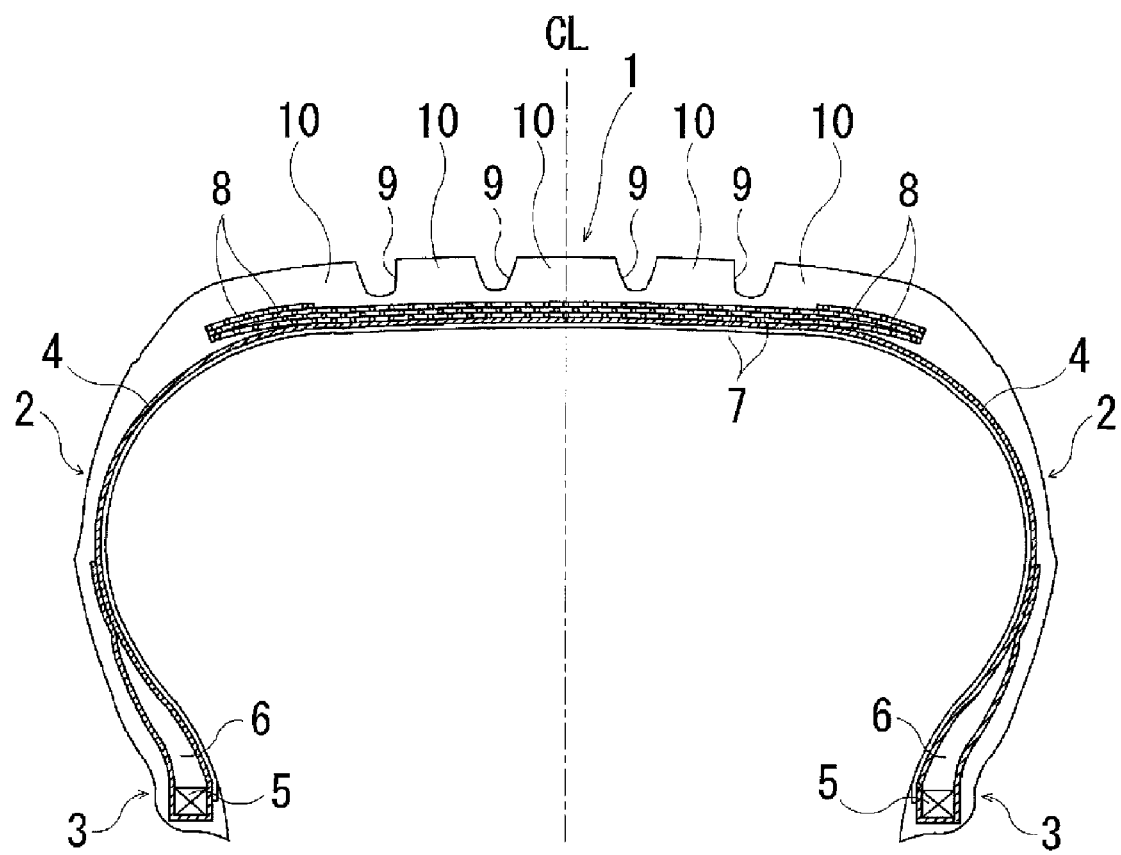
FIG. 1 is a meridian cross-sectional view illustrating a pneumatic tire according to an embodiment of the present technology.
Figure 2:
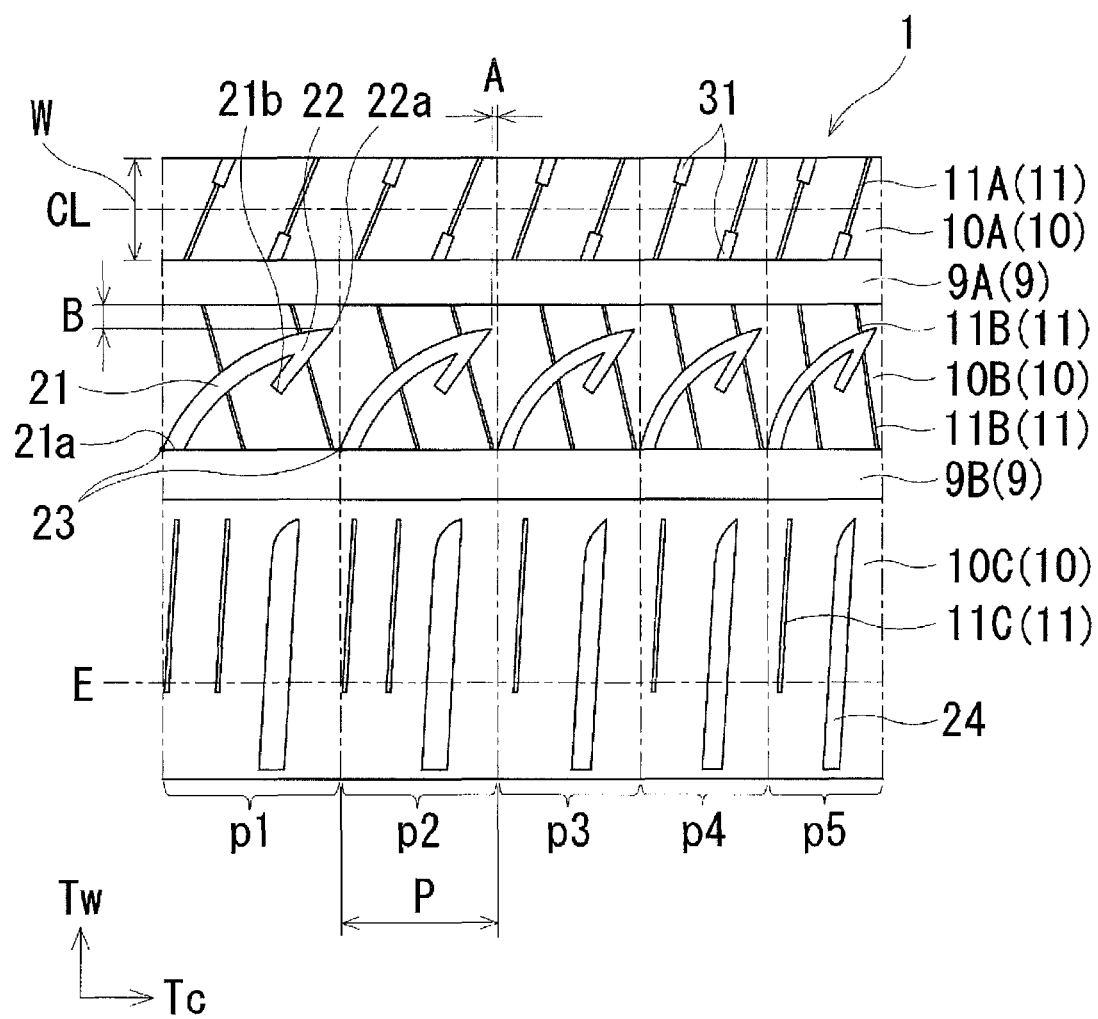
FIG. 2 is a plan view illustrating an example of a tread portion of a pneumatic tire according to the embodiment of the present technology.

Configurations of embodiments of the present technology will be described in detail below with reference to the accompanying drawings. FIGS. 1 and 2 illustrate a pneumatic tire according to an embodiment of the present technology. In FIG. 2, Tc indicates the tire circumferential direction and Tw indicates the tire lateral direction.

As illustrated in FIG. 1, a pneumatic tire according to an embodiment of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on the outer circumferential side of the carcass layer 4 in the tread portion 1. The belt layers 7 each include a plurality of reinforcing cords that are inclined with respect to the tire circumferential direction, the reinforcing cords being disposed between layers in a criss-cross manner. In the belt layers 7, the inclination angle of the reinforcing cords with respect to the tire circumferential direction falls within a range from 10° to 40°, for example. Steel cords are preferably used as the reinforcing cords of the belt layers 7. To improve high-speed durability, at least one belt cover layer 8, formed by arranging reinforcing cords at an angle of, for example, 5° or less with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

As illustrated in FIG. 2, four main grooves 9 extending in the tire circumferential direction are formed in the tread portion 1. The main grooves 9 includes a pair of inner main grooves 9A, 9A located on both sides of the tire center line CL and a pair of outer main grooves 9B, 9B located on the outermost side in the tire lateral direction. The tread portion 1 is divided into land portions 10 in by the four main grooves 9. The land portions 10 include a center land portion 10A located on the tire center line CL, a pair of intermediate land portions 10B, 10B located outward of the center land portion 10A in the tire lateral direction, and a pair of shoulder land portions 10C, 10C located outward of the intermediate land portions 10B, 10B in the tire lateral direction.

A plurality of sipes 11A and a plurality of narrow grooves 31, which are inclined in the same direction with respect to the tire lateral direction, are formed at intervals in the tire circumferential direction in the center land portion 10A. One end of the sipe 11A communicates with the inner main groove 9A, and the other end communicates with the narrow groove 31. That is, the sipe 11A is an open sipe. On the other hand, the narrow groove 31 is a groove having a larger grove width than the sipe 11A. One end of the narrow groove 31 communicates with the inner main groove 9A, and the other end communicates with the sipe 11A. The sipes 11A and the narrow grooves 31 are disposed alternately in the tire circumferential direction such that the narrow grooves 31 are disposed in a staggered manner in the tire circumferential direction as a whole of the center land portion 10A.

A plurality of lug grooves 21 inclined in the same direction with respect to the tire lateral direction are formed at intervals in the tire circumferential direction in the intermediate land portion 10B. One end 21a of the lug groove 21 opens to the outer main groove 9B, and the other end 21b terminates in the intermediate land portion 10B. The lug grooves 21 are disposed so as not to overlap each other in the tire circumferential direction. The lug groove 21 includes an acute bent portion 22 formed at a position between the one end 21a and the other end 21b.

A plurality of sipes 11B each extending in the direction that intersects with the lug groove 21 are formed at intervals in the tire circumferential direction in the intermediate land portion 10B. The sipe 11B has a structure divided into a plurality of sections by penetrating the lug groove 21, but the divided portions of the same sipe 11B are disposed on the same straight line.

One end of the sipe 11B communicates with the inner main groove 9A, and the other end communicates with the outer main groove 9B. That is, the sipe 11B is an open sipe.

A plurality of lug grooves 24 inclined in the same direction with respect to the tire lateral direction are formed at intervals in the tire circumferential direction in the shoulder land portion 10C. The lug grooves 24 do not communicate with the outer main groove 9B. A plurality of sipes 11C inclined in the same direction with respect to the tire lateral direction are formed at intervals in the tire circumferential direction in the shoulder land portion 10C. Both ends of the sipes 11C terminate within the shoulder land portion 10C. That is, the sipe 11C is a closed sipe.

In the pneumatic tire described above, pitches are defined based on end points 23, which serve as reference positions, at which the lug grooves 21 open to the outer main groove 9B in the intermediate land portion 10B, more specifically, the end points 23 located outward in the tire circumferential direction of one ends 21a of the lug grooves 21. One pitch is the area between two adjacent end points 23. In the tread portion 1, the pitch is repeatedly allocated in the tire circumferential direction using the positions of the end points 23 of the lug grooves 21 in the tire circumferential direction as reference positions, and a plurality of pitches are formed in the tire circumferential direction. A pitch length P, which is a length in the tire circumferential direction, is changed for each pitch. In the embodiment of FIG. 2, five regions are defined as pitches p1 to p5 in the decreasing order of pitch length P. Note that the type of pitch length P is not limited.

When the pitches p1 to p5 are defined in this manner, each sipe 11B is disposed to be located inside one of the pitches p1 to p5. That is, each of the sipes 11B is disposed so as not to span the plurality of pitches p1 to p5. Additionally, in the intermediate land portion 10B, a groove area ratio of each of the pitches p1 to p5 is set to be in a range from 15% to 25%. In particular, the groove area ratio of each pitch is preferably set to be in a range from 18% to 20%.

In the pneumatic tire described above, the intermediate land portion 10B is provided with the plurality of lug grooves 21 each having the acute bent portion 22, and the plurality of sipes 11B extending in the direction that intersects with the lug grooves 21, the lug grooves 21 are disposed so as not to overlap one another in the tire circumferential direction, and each have one end 21a that opens to the outer main groove 9B and the other end 21b that terminates in the intermediate land portion 10B. In this manner, snow performance (in particular, steering stability performance on snow-covered road surfaces) can be improved while suppressing a decrease in block rigidity. Additionally, when the pitches p1 to p5 are defined based on end points 23, which serve as reference positions, at which the lug grooves 21 open to the outer main groove 9B, the sipes 11B each are disposed to be located inside one of the pitches p1 to p5, and the groove area ratio in the pitches p1 to p5 in the intermediate land portion 10B is in the range from 15% to 25%. As a result, a decrease in the pattern rigidity can be suppressed. Furthermore, since the decrease in block rigidity can be suppressed, wear resistance as well as steering stability performance on dry road surfaces can be improved.

In the pneumatic tire described above, the lug groove 21 has an apex 22a at the bent portion 22. A distance in the tire circumferential direction from the apex 22a of the lug groove 21 to the pitch among the pitches p1 to p5, which are adjacent to the pitches p1 to p5 where the lug groove 21 is included, is designated as A. At this time, in each of the pitches p1 to p5, the distance A and the pitch length P preferably satisfy a relationship $0 \leq A \leq P \times 0.05$. For example, as illustrated in FIG. 2, the distance A in the tire circumferential direction from the apex 22a of the lug groove 21 in the pitch p2 to the adjacent pitch p3, and the pitch length P of the pitch p2 satisfy the relational formula described above. By configuring the lug grooves 21 to satisfy the above-mentioned relational formula in each of the pitches p1 to p5, snow performance can be efficiently improved.

A distance in the tire lateral direction from the apex 22a of the bent portion 22 of the lug groove 21 to the inner main groove 9A is designated as B. At this time, the distance B is preferably is in a range from 1/5 to 1/4 of a width W of the center land portion 10A. By setting the distance B appropriately to the width W of the center land portion 10A in this manner, block rigidity in the center land portion 10A and the intermediate land portions 10B can be made uniform, thereby effectively improving steering stability performance on dry road surfaces. Here, when the distance B is less than 1/5 of the width W of the center land portion 10A, the width W of the center land portion 10A becomes relatively wide to increase a difference in rigidity between the center land portion 10A and the intermediate land portions 10B, deteriorating snow performance.

Furthermore, a difference between a groove area ratio D1 of the intermediate land portion 10B and the groove area ratio D2 of the shoulder land portion 10C in the ground contact region is preferably 3% or less. That is, the groove area ratio D1 of the intermediate land portion 10B and the groove area ratio D2 of the shoulder land portion 10C in the ground contact region preferably satisfy a relationship $-3\% \leq (D1-D2) \leq 3\%$. By reducing the difference between the groove area ratio of the intermediate land portion 10B and the groove area ratio of the shoulder land portions 10C in this manner, steering stability performance on the snow-covered road surfaces can be efficiently improved. Here, when the difference between the groove area ratio D1 of the intermediate land portion 10B and the groove area ratio D2 of the shoulder land portion 10C becomes greater than 3%, at turning on the snow-covered road surfaces, snow discharge performance on the ground contact surface becomes non-uniform, deteriorating steering stability performance on snow-covered road surfaces. Note that the groove area ratio D1 of the intermediate land portion 10B and the groove area ratio D2 of the shoulder land portion 10C in the ground contact region satisfy the above-mentioned relationship as compared to the groove area ratio of each of the land portions in the entire tire circumference.

EXAMPLE

Using a pneumatic tire of tire size 225/50R18 including: an annular tread portion extending in a tire circumferential direction; a pair of sidewall portions disposed on both sides of the tread portion; and a pair of bead portions disposed inward of the sidewall portions in a tire radial direction, the tread portion being provided with four main grooves including a pair of inner main grooves and a pair of outer main grooves, the main grooves extending in the tire circumferential direction, a center land portion, a pair of intermediate land portions located outward of the center land portion, and a pair of shoulder land portions located outward of the intermediate land portions being divided via the main grooves, wherein the intermediate land portion was provided with a plurality of lug grooves each having an acute bent portion, and a plurality of sipes extending in a direction that intersects with the lug grooves, the lug grooves were disposed so as not to overlap one another in the tire circumferential direction, and each had one end that opens to the outer main groove and the other end that terminates in the intermediate land portion, when pitches were defined based on end points, which serve as reference positions, at which the lug grooves open to the outer main groove, the sipes each were disposed to be located inside one of pitches, tires of Examples 1 to 6 were produced by varying the groove area ratio (%) in each pitch of the intermediate land portion, the ratio of the distance A in the lug groove in the intermediate land portion to the pitch length P of each pitch, the ratio of the distance B in the lug groove in the intermediate land portion to the width W of the center land portion, and the difference (D1–D2) between the groove area ratio of the intermediate land portion and the groove area ratio of the shoulder land portion as illustrated in Table 1.

For comparison, a tire in a Conventional Example tire having the same structure as the tire in Example 1 was prepared except that the lug grooves formed in the intermediate land portions were disposed so as to overlap each other in the tire circumferential direction, and the groove area ratio in each pitch of the intermediate land portions was different. Tires in Comparative Examples 1, 2 were prepared having the same structure as the tire in Example 1 except that the groove area ratios at each pitch of the intermediate land portions were different.

Note that in Table 1, when "ratio of distance A in lug groove in intermediate land portion to pitch length P of each pitch" has a negative value, the lug grooves in the intermediate land portion overlap each other in the tire circumferential direction (in other words, the apex of each lug groove in the intermediate land portion is present in the pitch adjacent to the pitch where the lug groove is included).

These test tires underwent a sensory evaluation by a test driver for steering stability performance on snow-covered road surfaces and steering stability performance on dry road surfaces. The results thereof are shown in Table 1.

The sensory evaluation for steering stability performance on snow-covered road surfaces was performed with the test tires on a wheel with a rim size of 18×7J mounted on a front-wheel drive vehicle. The evaluation results were shown as 10 grade evaluation values. Larger index values indicate superior steering stability performance on snow-covered road surfaces.

The sensory evaluation for steering stability performance on dry road surfaces was performed with the test tires on a wheel with a rim size of 18×7J mounted on a front-wheel drive vehicle. The evaluation results were shown as 10 grade evaluation values. Larger evaluation values indicate superior steering stability performance on dry road surfaces.

TABLE 1

|  | Conventional Example | Comparative Example 1 | Comparative Example 2 | Example 1 |
|---|---|---|---|---|
| Groove area ratio in each pitch of intermediate land portion (%) | 28 | 28 | 13 | 20 |
| Ratio of distance A in lug groove in intermediate land portion to pitch length P of each pitch | −0.1 | 0.1 | 0.1 | 0.1 |
| Ratio of distance B in lug groove in intermediate land portion to width W of center land portion | 1/6 | 1/6 | 1/6 | 1/6 |
| Difference (D1 − D2) [%] between groove area ratio of intermediate land portion and groove area ratio of shoulder land portion | 5 | 5 | 5 | 5 |
| Steering stability performance on snow-covered road surfaces | 5.0 | 5.5 | 5.0 | 5.5 |
| Steering stability performance on dry road surfaces | 5.0 | 5.0 | 5.5 | 5.5 |

|  | Example 2 | Example 3 | Example 4 | Example 5 | Example 6 |
|---|---|---|---|---|---|
| Groove area ratio in each pitch of intermediate land portion (%) | 15 | 25 | 20 | 20 | 20 |
| Ratio of distance A in lug groove in intermediate land portion to pitch length P of each pitch | 0.1 | 0.1 | 0.05 | 0.05 | 0.05 |
| Ratio of distance B in lug groove in intermediate land portion to width W of center land portion | 1/6 | 1/6 | 1/6 | 1/4 | 1/4 |
| Difference (D1 − D2) [%] between groove area ratio of intermediate land portion and groove area ratio of shoulder land portion | 5 | 5 | 5 | 5 | 3 |
| Steering stability performance on snow-covered road surfaces | 5.5 | 5.5 | 6.0 | 6.0 | 6.5 |
| Steering stability performance on dry road surfaces | 5.5 | 5.5 | 5.5 | 6.0 | 6.0 |

As can be seen from Table 1, the tires in Examples 1 to 6 had improved steering stability performance on snow-covered road surfaces and steering stability performance on dry road surfaces in a well-balanced manner as compared to the tire in Conventional Example. Additionally, in the tires of Comparative Examples 1, 2, the numerical range of the groove area ratio in each pitch of the intermediate land portions defined in the present technology was not satisfied and thus, sufficient improvement effects were not obtained in either steering stability on snow-covered road surfaces or steering stability on dry road surfaces.

The invention claimed is:

1. A pneumatic tire comprising: an annular tread portion extending in a tire circumferential direction; a pair of sidewall portions disposed on both sides of the tread portion; and a pair of bead portions disposed inward of the sidewall portions in a tire radial direction, the tread portion being provided with four main grooves including a pair of inner main grooves and a pair of outer main grooves, the main grooves extending in the tire circumferential direction, a center land portion, a pair of intermediate land portions located outward of the center land portion, and a pair of shoulder land portions located outward of the intermediate land portions being divided via the main grooves, wherein the intermediate land portions are each provided with a plurality of lug grooves each having an acute bent portion, and a plurality of sipes extending in a direction that intersects with the lug grooves, the lug grooves are disposed so as not to overlap one another in the tire circumferential direction, and each have one end that opens to the outer main groove and an other end that terminates in the intermediate land portions, when pitches are defined parallel to a tire width direction based on end points, which serve as reference positions, at which the lug grooves open to the outer main groove, the sipes each are disposed to be located inside one of pitches, and a groove area ratio in the pitches in the intermediate land portions is in a range from 15% to 25%, and each of the sipes and the lug grooves are disposed to not span across a plurality of the pitches.

2. The pneumatic tire according to claim 1, wherein a distance A in the tire circumferential direction from an apex of a bent portion of one of the lug grooves to a pitch adjacent to a pitch where the one of the lug grooves is included, and a pitch length P in the tire circumferential direction of the pitch where the one of the lug grooves is included satisfy a relationship $0 \leq A \leq P \times 0.05$.

3. The pneumatic tire according to claim 1, wherein a distance in a tire lateral direction from an apex of the bent portions of the lug grooves to the inner main grooves is in a range from $\frac{1}{5}$ to $\frac{1}{4}$ of a width of the center land portion.

4. The pneumatic tire according to claim 1, wherein a difference between a groove area ratio of the intermediate land portions and a groove area ratio of the shoulder land portions in a ground contact region is 3% or less.

5. The pneumatic tire according to claim 2, wherein a distance in a tire lateral direction from an apex of the bent portions of the lug grooves to the inner main grooves is in a range from $\frac{1}{5}$ to $\frac{1}{4}$ of a width of the center land portion.

6. The pneumatic tire according to claim 5, wherein a difference between a groove area ratio of the intermediate land portions and a groove area ratio of the shoulder land portions in a ground contact region is 3% or less.

7. The pneumatic tire according to claim 1, wherein the pitches comprise a repeating pattern of five pitch lengths, in order of decreasing pitch length, disposed around an entire circumference of the pneumatic tire.

\* \* \* \* \*